United States Patent [19]

Matsui et al.

[11] Patent Number: 4,855,663

[45] Date of Patent: Aug. 8, 1989

[54] CHARGING CONTROL APPARATUS

[75] Inventors: Tomoki Matsui; Hidesuke Kimoto, both of Takatsuki; Setsuo Shimizu, Kamiminochi, all of Japan

[73] Assignee: Yuasa Battery Company Limited, Osaka, Japan

[21] Appl. No.: 159,352

[22] Filed: Feb. 23, 1988

[30] Foreign Application Priority Data

Feb. 27, 1986 [JP] Japan .................. 61-43502

[51] Int. Cl.⁴ .............................................. H02J 7/04
[52] U.S. Cl. ...................................... 320/20; 320/21; 320/39
[58] Field of Search .............................. 320/20, 21, 39

[56] References Cited

U.S. PATENT DOCUMENTS

| 3,992,658 | 11/1976 | Bechtold et al. | 320/20 |
| 4,354,148 | 10/1982 | Tada et al. | 320/20 |
| 4,392,101 | 7/1983 | Saar et al. | 320/20 |
| 4,503,378 | 3/1985 | Jones et al. | 320/20 |

Primary Examiner—R. J. Hickey
Attorney, Agent, or Firm—Watson, Cole, Grindle & Watson

[57] ABSTRACT

A charging control apparatus comprising a switching circuit for controlling a charging current from a charging power source to a storage battery. A reference voltage is provided which increases with a ramp corresponding to a value equal to, or more than, the maximum ramp value of the charging characteristic of the battery and a reference voltage is also provided which increases with time with a ramp corresponding to a value equal to, or less than, the minimum ramp value of the charging characteristic. The terminal voltage of the battery is sensed by a voltage sensor. A first comparator compares the reference voltage and a first sensed voltage from the voltage sensor. The ramp of the reference voltage is switched in accordance with the output of the first comparator. A second comparator compares the reference voltage and a second sensed voltage from the voltage sensor. The switching circuit is controlled by the output of the second comparator.

3 Claims, 2 Drawing Sheets

CHARGING CONTROL APPARATUS

BACKGROUND OF THE INVENTION

This invention relates to a charging control apparatus and more particularly to such apparatus which appropriately controls the charging of various storage batteries, inclusive of rapid charging of enclosed nickel-cadmium batteries.

There are various known apparatus of such type. For example, a device which stores the highest value of the terminal voltage of a storage battery and controls the charging when the terminal voltage is lowered by more than a predetermined value from the highest value. According to this device a fully charged state of an enclosed nickel-cadmium battery is achieved by controlling the charging when the terminal voltage is lowered by a predetermined value from its highest value at the end of the charging. Such predetermined value is about 20 mV at 1 C charging and a very fine value. In addition, in this charging device, the highest terminal voltage stored in the capacitor decreases with time due to leakage of electric current, so that control of the charging becomes impossible.

When the battery is overcharged, overdischarged or left unused for a long time, a peak value of the terminal voltage such as generated at the charging end may be generated at the beginning of the charging, as shown in FIG. 3. When the environmental temperature is above 40° C., the terminal voltage may virtually not decrease even at the end of the charging, as shown in FIG. 4, to thereby generate insufficient charging or overcharging.

In order to solve such problems, there is a known device which has either an initial lock timer which stops the charging control for a predetermined time at the beginning of the charging or an overcharging protective timer which stops the charging a predetermined time after the charging has started. Provision of such timer would render the circuit complicated. In addition, if a partially discharged battery which, for example, has a remaining capacity of about 50% is 1C charged under a condition where the environmental temperature is above 40° C., a peak value will be generated in about 30 minutes. However, since the terminal voltage hardly lowers, a terminal voltage which is lowered by the predetermined value from the highest value cannot be sensed, so that the charging continues until a time set by the overcharging protective timer to thereby create overcharging.

This invention eliminates the above drawbacks. It is an object of this invention to provide a charging control apparatus which has a circuit structure capable of appropriately charging any kind of storage battery in any discharged state to thereby to prevent overcharging and insufficient charging of various kinds of storage batteries including an enclosed battery used in electronic devices, especially partially discharged batteries.

SUMMARY OF THE INVENTION

This invention provides a charging control apparatus comprising:

a switching circuit for controlling a charging current from a charging power source to a storage battery;

means for providing a reference voltage increasing with a ramp corresponding to a value equal to, or more than, the maximum ramp value of the charging characteristic of the battery and a reference voltage increasing with time with a ramp corresponding to a value equal to, or less than, the minimum ramp value of the charging characteristic;

a voltage sensor for sensing the terminal voltage of the battery;

first comparing means for comparing the reference voltage and a first sensed voltage from the voltage sensor;

means for switching the ramp of the reference voltage in accordance with the output of the first comparing means;

second comparing means for comparing the reference voltage and a second sensed voltage from the voltage sensor: and the switching circuit being controlled by the output of the second comparing means.

DETAILED DESCRIPTION

Figure 2:
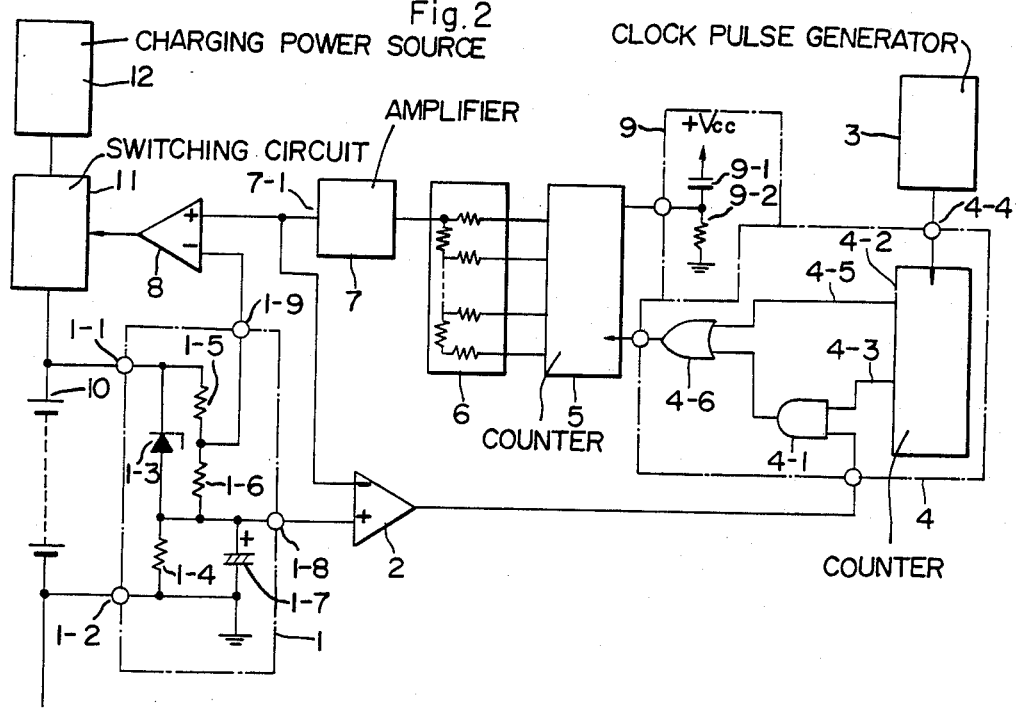
FIG. 2 is a circuit diagram of the apparatus.
Figure 3:
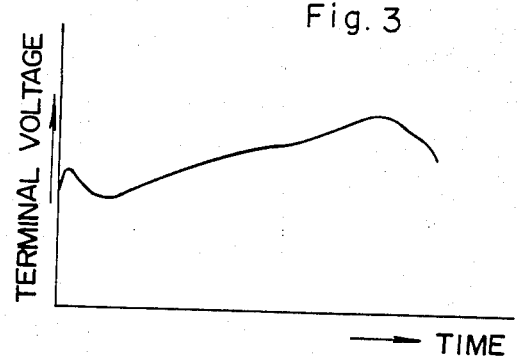
FIGS. 3 and 4 show an example of the charging characteristic.
Figure 4:
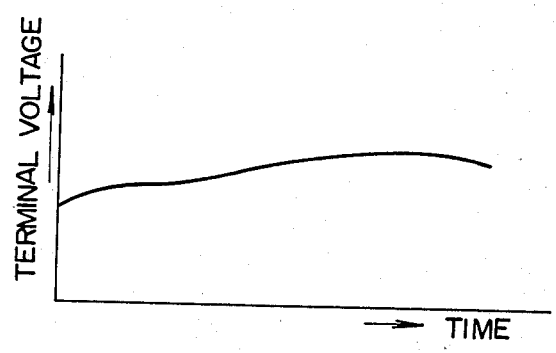

An embodiment of this invention will now be described. In FIG. 2, a storage battery 10 is charged via a switching circuit 11 which controls the charging current from a charging power source 12. In order to sense a voltage corresponding to the terminal voltage, the terminal voltage of the battery is applied across the terminal 1-1 and 1-2 of a voltage sensor 1. A constant-voltage diode 1-3 and a resistor 1-4 are connected in series across the terminals 1-1 and 1-2, and a series connection of resistors 1-5 and 1-6 is connected in parallel with the diode 1-3. Resistor 1-4 is connected in parallel with a capacitor 1-7. A first voltage sensed by the voltage sensor 1 is obtained from the junction between the diode 1-3 and resistor 1-4, output from a terminal 1-8 and input to a non-inverting input terminal of a first comparator 2. A second sensed voltage is obtained from the junction between resistor 1-5 and 1-6, output from a terminal 1-9 and input to an inverting input terminal of a second comparator 8. The output from first comparator 2 is input to one terminal of an AND gate 4-1 of a frequency divider 4 and a 1:16 divider output 4-3 which is the fourth stage output of a counter 4-2 is input to another input terminal of AND gate 4-1 in order to obtain a ramp-like reference voltage corresponding to the maximum ramp value of the charging characteristic. On the other hand, clock pulses having a predetermined frequency output from a clock pulse generator 3 are input to a clock input terminal 4-4 of counter 4-2 within the frequency divider 4. In order to obtain a ramp-like reference voltage corresponding to a minimum ramp value of the charging characteristic, a 1:2048 divider output 4-5 which is the 11th stage output of counter 4-2 is input to one of input terminals of an OR gate 4-6, the other input terminal of which receives the output of AND gate 4-1. The output of OR gate 4-6 is input to a clock input terminal of counter 5, the respective frequency division outputs from counter 5 are output at 7-1 via a resistor ladder 6 having an additive function and an amplifier 7 having an impedance conversion function as a ramp-like reference voltage corresponding to the maximum or minimum ramp value of the charging characteristic. Namely, counter 5, resistor ladder 6 and amplifier 7 perform a D to A conversion. The reference voltage is input to an inverting terminal of first comparator 2 and a non-inverting input terminal of second comparator 8, the output of which controls the operation of switching circuit 11.

Figure 5:
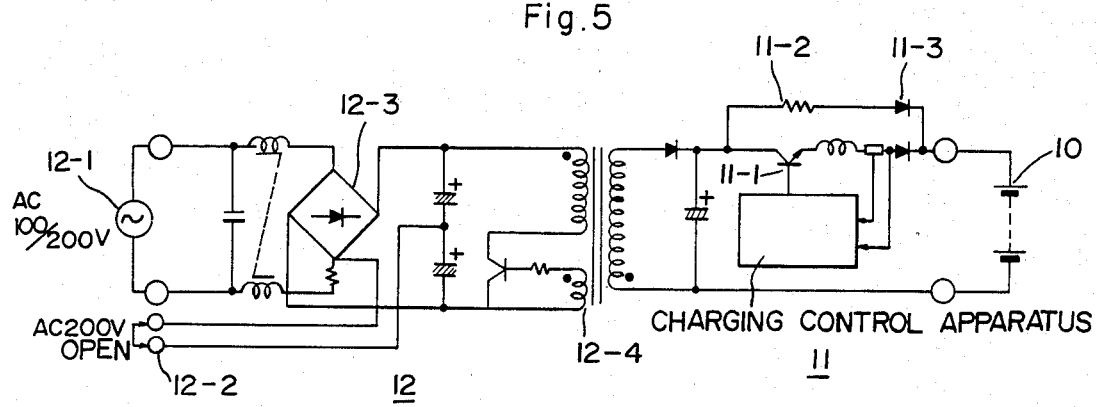
FIG. 5 is a circuit diagram in which the charging control apparatus according to this invention is used.

The switching circuit 11 includes a charging power source 12 which in turn comprises a rectifier which rectifies a commercially available power source and a ringing choke type converter, and a constant-voltage, constant-current control chopper circuit which receives an input from the power source 12. The switching circuit 11 and charging power source 12 will now be described in more detail with reference to FIG. 5. The charging power source 12 includes a rectifier circuit 12-3 which has a switch 12-2 which switches between a voltage doubler rectification used when the voltage of the commercial available power source 12-1 is at a 100 V system and a full-wave rectification used when the voltage is at a 200 V system, and a ringing choke type converter 12-4 with the switching circuit 11 being isolated from the commercially available power source 12-1. The switching circuit 11 has a transistor 11-1 which is subjected to constant-voltage and constant-current control by a charging control device including the first and second comparators 2 and 8.

Figure 1:
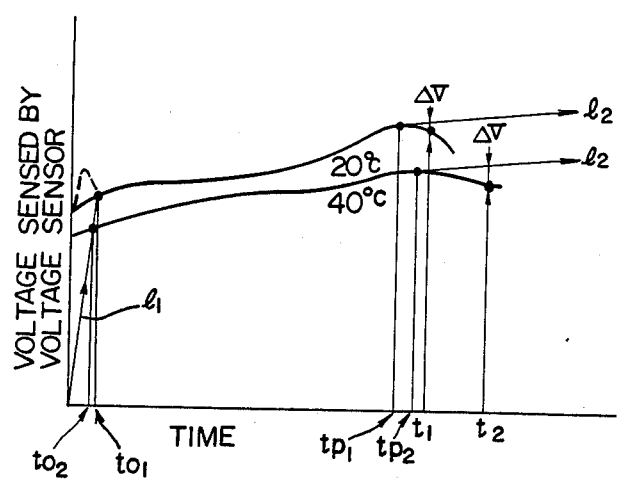
FIG. 1 illustrates the principles of a charging control apparatus according to this invention.

When a storage battery 10 is connected to the charging control apparatus according to this invention, as shown in FIG. 1, clock pulse generator 3 generates pulses at a constant frequency, the terminal voltage of the battery is applied across the terminal 1-1 and 1-2 of voltage sensor 1, and counter 5 is reset by a differentiating circuit 9 including a capacitor 9-1 and resistor 9-2. Therefore, the output 7-1 of amplifier 7 becomes 0 V, the output of the first comparator 2 becomes high and the output of second comparator 8 becomes low. When the output of second comparator 8 is low, the switching circuit 11 is arranged to be turned on, and charging to battery 10 starts via switching circuit 11 from power source 12. Pulses having the same frequency as the fourth stage output 4-3 of counter 4-2 appear at the output of AND gate 4-1 which receives the output of first comparator 2 and the fourth stage output 4-3 of counter 4-2. Pulses having the same frequency as the fourth stage output 4-3 of counter 4-2 appear at the output of OR gate 4-6 which receives the first mentioned pulses and the 11th stage output of counter 4-2. Thus a ramp corresponding to the frequency of the fourth stage output 4-3 of counter 4-2, i.e., a ramp-like reference voltage corresponding to the maximum value of ramp of the charging characteristic, is obtained at the output 7-1 via counter 5, resistor ladder 6 and amplifier 7. This operation will be described with reference to FIG. 1. The ramp-like reference voltage 11 corresponding to the maximum ramp value of the charging characteristic increases with that ramp when the charging starts and coincides with the charging characteristic curve at a time t01 when the environmental temperature is at 20° C. and at a time t02 when the environmental temperature is at 40° C. Therefore, the output of second comparator 8 remains low until the times t01 and t02 are reached, so that the switching circuit 11 will not be turned off even if a peak is generated at the beginning of the charging as shown by broken lines in FIG. 1. When the ramp-like reference voltage 11 coincides with the charging characteristic curve, the output of the first comparator 2 becomes low and the output of AND gate 4-1 also becomes low. Therefore, pulses having the same frequency as the 11th output 4-5 of counter 4-2 appear at the output of OR gate 4-6 while a ramp-like reference voltage corresponding to a ramp corresponding to the frequency of the 11th output 4-5 of counter 4-2, namely, the minimum ramp value of the charging characteristic, via counter 5, resistor ladder 6 and amplifier 7 are obtained at the output 7-1. As charging proceeds and the terminal voltage of the battery increases in this way, the ramp-like reference voltage increases with a ramp corresponding to the minimum ramp of the charging characteristic. When gases start to be produced at the end of the charging, the terminal voltage rapidly increases and an increase in the reference voltage does not follow, so that the output of the first comparator 2 becomes high again. Therefore, the reference voltage increases with a ramp corresponding to the maximum ramp value of the charging characteristic. When the battery reaches its fully charged state and a peak value or a flat portion appears at its terminal voltage, the reference voltage again start to increase with a ramp corresponding to the minimum ramp value of the charging characteristic. Thereafter, even if the terminal voltage starts to lower or remains flat, the reference voltage continues to increase, so that the difference between the terminal voltage and the reference voltage becomes $\Delta V$ at a time t1 when the environmental temperature is at 20° C. and at time t2 when the environmental temperature is at 40° C. If the value of resistors 1-5 and 1-6 are determined such that the $\Delta V$ value coincides with the difference voltage between the first sensed voltage output from the terminal 1-8 of voltage sensor 1 and the second sensed voltage output from the terminal 1-9, the output of second comparator 8 becomes high at times t1 and t2, so that the switching circuit 11 is turned off to thereby stop charging.

The 1C charging of a single enclosed nickel-cadmium battery will now be described using the charging control apparatus according to this invention. In that case, the terminal voltage changes between 1.3 V and 1.6 V and increases at a rate of about 1 mV/minute, so that the output voltage of terminal 1-8 changes between 0.3 V and 0.6 V assuming that constant-voltage diode 1-3 provides 1.0 V. It is assumed that the oscillating frequency of clock pulse generator 3 is 107 Hz. The fourth stage output of counter 4-2 which provides a ramp-like reference voltage corresponding to the maximum ramp value of the charging characteristic is a 16-divided frequency which provides 6.7 Hz while the 11th stage output of counter 4-2 which provides a ramp-like reference voltage corresponding to the minimum ramp value of the charging characteristic is a 2048-divided frequency which provides 0.052 Hz. Therefore, when charging starts, the reference voltage increases with a ramp corresponding to a 6.7 Hz pulse, so that if resistor ladder 6 and the gain of amplifier 7 are determined such that the output 7-1 of amplifier 7 increases 0.2 mV at a time when one pulse is counted, 6.7 pulses are counted for one second. Therefore, the reference voltage increases with a rate of 80 mV/minute and becomes 0.4 V five minutes after charging starts to thereby exceed the output of terminal 1-8. When the output of first comparator 2 becomes low, the reference voltage increases with a ramp corresponding to a 0.052 Hz pulse, so that 0.052 pulses are counted for one second and the reference voltage increases with a rate 0.63 mV/minutes. If the values of resistors 1-5 and 1-6 are determined such that $\Delta V$ is 20 mV in order to sense the fully charged state properly, it is possible to stop the charging 32 minutes after the peak value is arrived at even if the charging characteristic becomes flat to thereby prevent overcharging. When the terminal voltage is lowered, the charging is stopped earlier for an increase in the reference voltage, but the ramp with which the reference voltage increases is very small, so that insufficient charging does not occur.

In the particular embodiment, it is assumed that the oscillating frequency of clock pulse generator 3 is 107 Hz. In addition, the fourth stage output of counter 4-2 is used to obtain a ramp-like reference voltage corresponding to the maximum ramp value of the charging characteristic and the 11th stage output of counter 4-2 is used to obtain a ramp-like reference voltage corresponding to the minimum ramp of the charging characteristic. This is so because the charged battery is a sole enclosed nickel-cadmium storage battery, so that the reference voltage may optionally be changed so as to correspond to a value above the maximum ramp value, or a value below the minimum ramp value, of the charging characteristic of the charged battery or so as to depend on the number of batteries used. The difference voltage ΔV between the first and second sensed voltages of the voltage sensor may be changed optionally. Of course, the switching circuit 11 may be modified so as to include a series circuit of resistor 11-2 and diode 11-3 to perform limiting control instead of on/off control.

As described in detail in the particular embodiment, according to the inventive charging control apparatus, the use of a ramp-like reference voltage corresponding to a value above the maximum ramp value of the charging characteristic prevents charging from stopping even if a peak appears on the terminal voltage at the beginning of charging. The ramp-like reference voltage corresponding to a value below the minimum ramp value of charging characteristic prevents the battery from being overcharged or insufficiently charged even if a peak appears on the charging voltage in the vicinity of the fully charged state and the terminal voltage starts then to lower or remains unchanged. Thus it is possible to partially charge various batteries, especially partially discharged batteries, inclusive of enclosed nickel-cadmium batteries.

We claim:

1. A battery charging control apparatus comprising:
    a charging power supply source;
    a switching circuit for controlling the charging current from said charging power source to a storage battery;
    ramp generating means for providing a first ramp reference voltage increasing with time corresponding to a value equal to, or more than, the maximum ramp value of the charging characteristic of the storage battery and a second ramp reference voltage increasing with time and corresponding to a value equal to, or less than, the minimum ramp value of the charging characteristic of the storage battery;
    a voltage sensor for sensing respective first and second voltages relating to the terminal voltage of said storage battery;
    first comparing means for providing a first output when said first voltage coincides with said first ramp reference voltage and a second output when said first voltage coincides with said second ramp reference voltage;
    said ramp generating means providing said first ramp reference voltage with said second output and said first ramp reference voltage with said first output; and
    second comparing means for controlling said switching circuit to terminate charging when said second voltage coincides with said second ramp reference voltage.

2. A battery charging control apparatus according to claim 1, wherein the charging power supply source includes a rectifier for rectifying a commercially available power source and a ringing choke type converter and wherein the switching circuit includes a chopper circuit for receiving the output of the converter to control charging of the battery.

3. A charging control apparatus according to claim 1, wherein the first sensed voltage from the voltage sensor is lower by a predetermined value than the second sensed voltage.

* * * * *